Aug. 20, 1929.  J. C. STEINER  1,725,221
PORTABLE JUICE EXTRACTOR
Filed Feb. 16, 1927   2 Sheets-Sheet 1
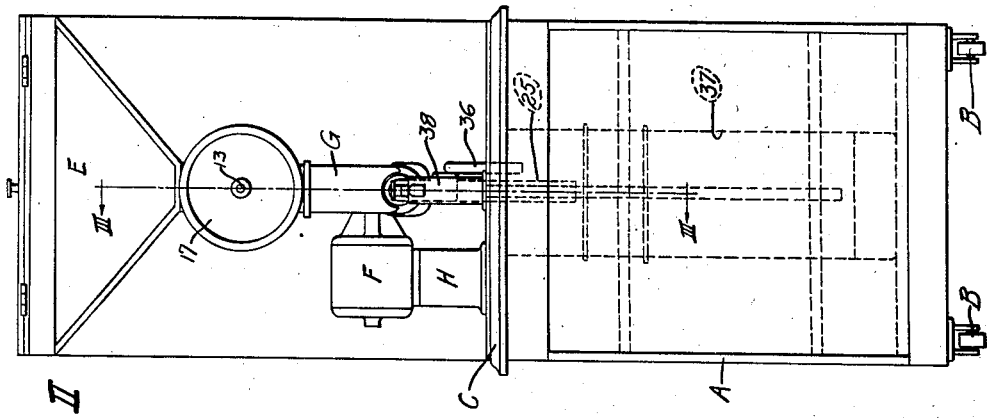
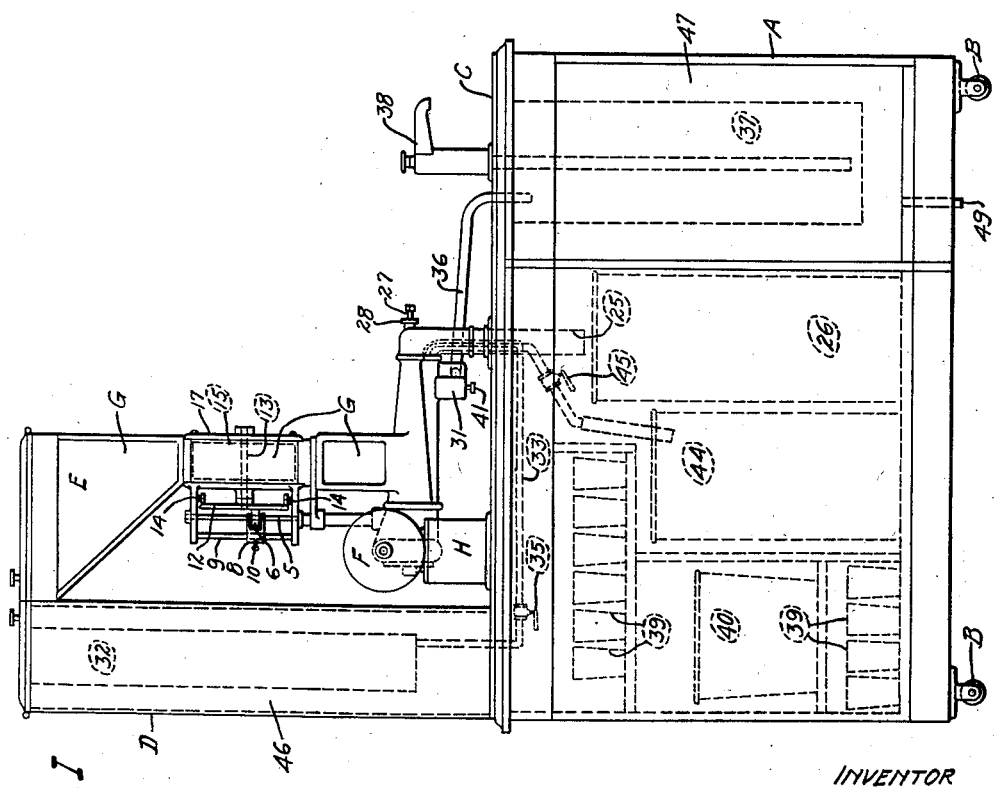
INVENTOR
J. C. STEINER
By J. H. S. Cook
ATTORNEY

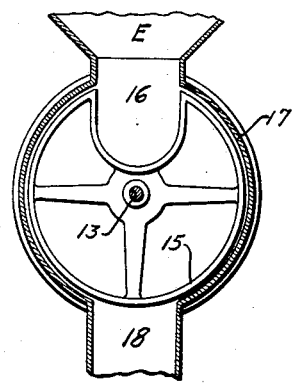
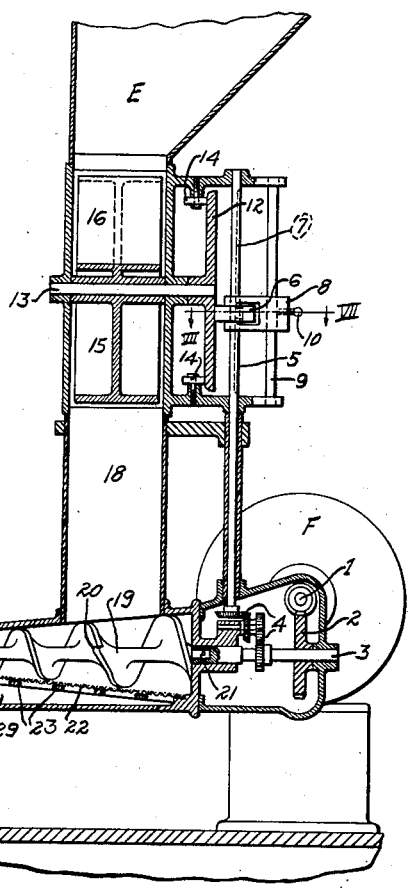
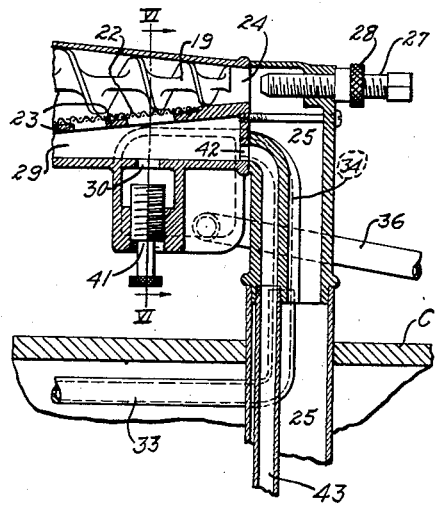
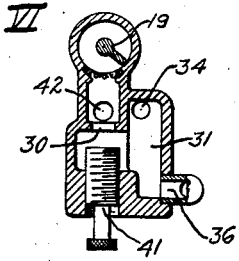

Patented Aug. 20, 1929.

1,725,221

UNITED STATES PATENT OFFICE.

JOSEPH C. STEINER, OF ST. LOUIS, MISSOURI.

PORTABLE JUICE EXTRACTOR.

Application filed February 16, 1927. Serial No. 168,549.

My invention relates to a portable juice extractor and has for its object to produce a compact device of this character with a container for oranges, lemons, or other similar fruit, and means for delivering said fruit to a squeezing device, discharging the juice into a juice container, and the offal into a proper retainer to receive the same.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a side elevation of my improved device.

Fig. II is an end elevation of my improved device.

Fig. III is an enlarged sectional view taken along the line III—III, Fig. II.

Fig. IV is an enlarged detail view of the fruit delivery wheel for delivering oranges, lemons, etc., one at a time, to the squeezing device.

Fig. V is an enlarged sectional view of the squeezing end of my device and the associated parts connected therewith.

Fig. VI is a view taken along the line VI—VI, Fig. V.

Fig. VII is a view taken along the line VII—VII, Fig. III.

In the drawings, A designates a case, or counter, supported upon casters B having a serving top C and an upper extension D. E is a receptacle for the fruit, such as oranges, lemons, etc., preferably provided with glass sides so that the fruit may be observable in said container. F is an electric motor designed to operate the fruit delivery wheel and the fruit squeezer.

The shaft 1 of the motor F has a gear wheel meshed with a large gear wheel 2 mounted on a shaft 3. 4 designates a series of gears adapted to drive a shaft 5, near the upper end of which a fiber disk wheel 6 is mounted. A keyway 7 is provided in the shaft to permit the fiber disk 6 to be moved longitudinally of said shaft. 8 designates a bracket mounted for sliding movement on a bar 9 and adapted to be locked to said bar by a thumbscrew 10. The inner end of the bracket 8 surrounds the shaft 5, and between the arms of the inner end of said shaft 8 the fiber disk wheel 6 is adapted to rotate. A key 11 is employed in connection with said fiber disk wheel 6 for causing said fiber disk wheel and shaft 5 to rotate together.

12 designates a metal disk secured to the shaft 13 and adapted to rotate with said shaft. 14 designates two small wheels in contact with one side of the metal disk 12 to prevent displacement or distortion of said metal disk 12. 15 is a wheel also secured to the shaft 13 and adapted to rotate with said shaft. 16 designates a pocket provided in said wheel 15 and of a size sufficient to contain an orange, lemon, or other fruit from which the juice is to be squeezed. This wheel is mounted for rotation in a circular housing 17. As shown in Fig. IV, the opening 16 is in registration with the fruit-holding receptacle E so as to permit an orange or a lemon to be delivered into said opening 16 from said receptacle E. As the wheel rotates it comes in registration with an opening 18, which leads to the juice-squeezing device.

By the arrangement shown in Fig. III the fiber disk wheel 6 may be shifted up and down on the shaft 5, and it will be noted that the metal disk 12 which is driven through its contact with the fiber disk wheel 6 may be driven faster or slower, depending on whether the fiber disk wheel 6 is nearer the center of the metal wheel 12 or the outer portion thereof; that is to say, the fruit may be delivered fast or slow according as the fiber disk wheel is set close to or away from the center of the metal disk wheel 12, thereby turning said delivery wheel 15 fast or slow.

The fruit passing through the delivery chute 18 falls on a spiral squeezing member 19, which has a cut-out portion 20 in the vane in registration with said delivery chute so as to catch and drag in to the squeezing member the fruit that is delivered thereto. It will be noted that the squeezing member is tapered toward the discharge end and that said squeezing member is driven through a connection at 21 with the shaft 3. 22 designates a screen of a mesh sufficiently fine to prevent the passage therethrough of any considerable amount of pulp of the juice being extracted, and 23 designates supports on which the screen 22 is adapted to rest. As the fruit travels along the squeezing member 19 and the juice is extracted, peeling and pulp are discharged from the end 24, falling into the chute 25 and being discharged into a container 26 (Fig. I).

27 designates a screw for regulating the discharge of the offal from the squeezing element 19. In the position shown in Fig. III the offal has been squeezed relatively dry before it is permitted to escape into the discharge tube 25. If the regulator 27 is screwed outwardly and away from the discharge opening 24 the offal is permitted to escape less thoroughly squeezed and therefore containing more or less juice. It is apparent that this regulator 27 is available for manipulation by the operator of the machine so as to get such dryness of the offal as may be desired. 28 designates a lock nut for holding the regulator 27 in adjusted position. As the juice is squeezed out of the fruit it passes through the screen 22 into a passageway 29, and under normal conditions it will pass through an opening 30 into a chamber 31, which I designate the mixing chamber. Into this same chamber 31 sugar water from a tank 32 (Fig. I) is led by the pipe 33 and enters the mixing chamber 31 through the opening 34. The amount of sugar water relative to the amount of fruit juice may be regulated by the cock 35 (Fig. I). The commingled fruit juice and sugar water pass out of the mixing chamber 31 through the pipe 36 and are discharged into a container therefor designated 37 (Fig. I). Such commingled fruit juice and sugar water is adapted to be pumped from the container 37 by the pump 38 into a series of glasses 39, which, for convenience, are stored in the receptacle A as illustrated in Fig. I. 40 designates a rinse bucket for said glasses.

If the container 37 is sufficiently filled for immediate requirements and the operator desires to squeeze more fruit juice, he may shut off the flow of sugar water by the cock 35 and, by screwing up the shut-off valve 41, close the opening 30, which will cause the fruit juice passing through the screen 22 to pass out through the opening 42 into the pipe 43 and therethrough into the surplus fruit juice container 44 (Fig. I). By this method a surplus quantity of pure fruit juice may be accumulated in the surplus juice container 44. It will be understood that the cock 45 in the pipe 43 is normally closed during the time the juice tank 37 is being filled with commingled fruit juice and sugar water. This cock is only open when the container 37 is filled to the required amount and it is desired to get pure fruit juice in the surplus tank 44.

It might be noted that during the progress of the fruit from the receptacle E until it is delivered to the squeezer 19 it is in sight through glass panels, which I have designated in Fig. I by the letter G. H designates a support for the motor, which support rests upon the top of the counter C.

The sugar water receptacle 32 is preferably surrounded with a space 46 for holding ice to keep said sugar water properly chilled. 47 designates a space surrounding the container 37, also for the purpose of containing ice. 49 designates a drain for removing surplus water that accumulates in the space 47.

I claim:

1. A fruit squeezing apparatus comprising, in combination, a chamber, a fruit squeezing device mounted within the chamber, a fruit receptacle, means for delivering fruit periodically from the receptacle to the squeezing chamber, a single source of power for driving both the squeezing device and the delivering means, and means for adjusting the speed of operation of the delivering means independently of the speed of operation of the squeezing device.

2. A fruit squeezing apparatus comprising, in combination, a chamber, a fruit squeezing device mounted within the chamber, a fruit receptacle, means for delivering fruit periodically from the receptacle to the squeezing chamber, means independent of the squeezing device for controlling the passage of offal from the chamber, and means for controlling the rate of delivery of fruit from the receptacle to the squeezing chamber.

3. A fruit squeezing apparatus comprising, in combination, a chamber, a fruit squeezing device mounted within the chamber, a fruit receptacle, means for delivering fruit periodically from the receptacle to the squeezing chamber, means for controlling the passage of offal from the squeezing device, said means comprising an adjustable abutment located adjacent to the squeezing device in the path of the discharge of the offal, and means for controlling the delivery of fruit from the receptacle to the squeezing chamber.

In testimony that I claim the foregoing I hereunto affix my signature.

JOSEPH C. STEINER.